United States Patent Office 3,567,802
Patented Mar. 2, 1971

3,567,802
PERFLUOROPOLYOXOALKANE SUBSTITUTED PHOSPHINATES
Bruce H. Garth, Newark, Del., assignor to E. I. du Pont de Nemours and Company, Wilmington, Del.
No Drawing. Filed Dec. 3, 1968, Ser. No. 780,871
Int. Cl. C07f 9/32
U.S. Cl. 260—950                                      5 Claims

ABSTRACT OF THE DISCLOSURE

Perfluoropolyoxoalkane substituted phosphinates having the formula $R_fO(C_3F_6O)_mCFXCH_2OP(:O)(C_6H_5)_2$ or $(C_6H_5)_2P(:O)OCH_2CFX(C_3F_6O)_mCFXCH_2OP$
$(:O)(C_6H_5)_2$ wherein $R_f$ is a perfluoroalkyl group of 1–6 carbon atoms, $m$ is an integer in the range 3–50, and X is —F or —$CF_3$, useful as high temperature lubricants and hydraulic fluids, and as corrosion and degradation inhibitors for poly(hexafluoropropylene oxide) oils having the formula $$R_f(C_3F_6O)_nR'_f$$
$$R_fO(C_3F_6O)_nCF(CF_3)H, \text{ or}$$
$$R_fO[CF(CF_3)CF_2O]_nCF(CF_3)CF(CF_3)$$
$$[OCF_2CF(CF_3)]_nOR_f$$

wherein $R_f$ is as defined above, $R'_f$ is a perfluoroalkyl group of 1–2 carbon atoms, and $n$ is an integer, said oils also having an average molecular weight of at least 3,000, a pour point not in excess of 10° C., and a volatility of less than 50% at 204.4° C.

BACKGROUND OF THE INVENTION

(1) Field of the invention

This invention relates to perfluoropolyoxoalkane substituted phosphinates.

(2) Description of the prior art

Richardson et al. in U.S. Pat. 3,340,331 disclose fluorine-containing dialkylphosphinates as thermally and hydrolytically stable hydraulic fluids, said phosphinates having the formula $$(alkyl)_2P(:O)—O—Ar—(CH_2)_m(CF_2)_nCF_3$$

wherein each of said alkyl groups has 1–8 carbon atoms, Ar is a bivalent aromatic hydrocarbon radical which is free of olefinic and acetylenic unsaturation and has 6–12 carbon atoms, $m$ is 1–4, and $n$ is 0.

McBee et al. in U.S. Pat. 2,899,454 disclose fluorine-containing dialkyl alkylphosphonates as chemical intermediates and additives for lubricating and hydraulic fluids, said phosphonates having the formula $$RP(:O)OR'_2$$

wherein R and R' are alkyl groups, either or both of which is substituted with a perfluoroalkyl group of 1–8 carbon atoms.

Borecki in U.S. Patent 3,306,855 discloses perfluoroalkylether phosphate esters as corrosion and rust inhibitors for poly(hexafluoropropylene oxide) oil compositions, said esters having the formula $$[R_fO[CF(CF_3)CF_2O]_mCF(CF_3)CH_2O]_\omega P(:O)(OH)_{3-\omega}$$

wherein $R_f$ is a perfluoroalkyl group of 1–6 carbon atoms, $m$ is 0–12, and $\omega$ is 1–2.

Poly(hexafluoropropylene oxide) oils have become known in the art for their usefulness as high temperature lubricants. These and similar oils can be prepared by a variety of techniques which involve polymerization of hexafluoropropylene oxide, alone or in admixture with other reactive fluorinated compounds, followed by an end capping or end group stabilizing reaction. The polymerization reaction can be carried out with a variety of catalysts, such as certain fluoride ions or carbon. Such polymers also can be prepared by a photooxidative polymerization of hexafluoropropylene. The aforesaid polymers all have hexafluoropropylene oxide repeat units which can be joined together in the polymer chain in either a random or an ordered sequence. The repeat units in a random or an ordered sequence hereinafter will be designated $(C_3F_6O)$, and those in an ordered sequence, $[CF(CF_3)CF_2O]$. Examples of the aforesaid polymers and/or the catalysts and techniques employed in the polymerization of hexafluoropropylene oxide or in the photooxidative polymerization of hexafluoropropylene are disclosed by Moore et al. in U.S. Pat. 3,250,808; by Moore in U.S. Pat. 3,322,826 and in Canadian Pats. 707,359 and 707,361; by Fritz et al. in U.S. Pat. 3,250,807; by Selman in U.S. Pat. 3,274,239; by Selman et al. in U.S. Patent 3,342,875; by Sianesi et al. in French Pat. 1,434,537; and by Sianesi in Chimica e l'industria 50:206–214 (1968). The poly(hexafluoropropylene oxide) polymers, as initially prepared, contain unstable acid fluoride end groups. These can be replaced with stable fluorine atoms by a series of reactions which include hydrolysis, decarboxylation, and fluorination, as disclosed by Miller in U.S. Pat. 3,242,218. Stable polymers also can be produced by an elimination-coupling reaction induced by ultraviolet light, as disclosed by Milian in U.S. Pat. 3,214,478, or the acid fluoride end group can be replaced with a hydrogen atom as disclosed in the aforesaid U.S. Pat. 3,342,875.

Although poly(hexafluoropropylene oxide) oils having stabilized end groups are useful as high temperature lubricants, corrosion problems often are encountered when said use involves contact with certain metals. Moreover, in some uses, polymer degradation occurs, either with or without concomitant corrosion of metal being contacted. The aforesaid problems are particularly acute at use temperatures of about 260–370° C. (500–700° F.), and when the metal being contacted is steel, a stainless steel, aluminum, titanium or alloy of titanium.

OBJECTS AND SUMMARY OF THE INVENTION

It is an object of the present invention to provide a thermally stable perfluorinated phosphinate which is useful as a high temperature lubricant or hydraulic fluid. It is another object to provide an additive for poly(hexafluoropropylene oxide) oils, which additive acts as a corrosion and oil degradation inhibitor. Still another object is to provide such an inhibitor which is compatible with the oil under use conditions, and which does not materially affect the physical properties of the oil, particularly lubricity, viscosity and viscosity index. Another object is to provide such an inhibitor which is especially useful at temperatures of about 260–370° C. (500–700° F.) and when the oil is in contact with steel, a stainless steel, aluminum, titanium or alloy of titanium. Other objects will become apparent hereinafter.

The objects of the present invention are achieved by means of a perfluorinated polyether substituted methyldiphenyl phosphinate having the formula $$R_f O(C_3F_6O)_m CFXCH_2OP(:O)(C_6H_5)_2$$

or $$(C_6H_5)_2 P(:O)OCH_2 CFX(C_3F_6O)_m CFXCH_2OP(:O)(C_6H_5)_2$$

wherein $R_f$ is a perfluoroalkyl group of 1–6 carbon atoms, $m$ is an integer in the range 3–50, and X is —F or —CF$_3$. Such a phosphinate is useful either as such as a high temperature lubricant or hydraulic fluid, or as an additive for poly(hexafluoropropylene oxide) oils, which additive acts as a corrosion and oil degradation inhibitor, especially at temperatures of about 260–370° C. (500–700° F.) and when the oil is in contact with steel, a stainless steel, aluminum, titanium or alloy of titanium.

DETAILED DESCRIPTION OF THE INVENTION

The present invention resides in a perfluorinated polyether substituted methyldiphenyl phosphinate having the formula $R_f O(C_3F_6O)_m CFXCH_2OP(:O)(C_6H_5)_2$ or $$(C_6H_5)_2 P(:O)OCH_2 CFX(C_3F_6O)_m CFXCH_2OP(:O)(C_6H_5)_2$$

wherein $R_f$ is a perfluoroalkyl group of 1–6 carbon atoms, $m$ is an integer in the range 3–50 and X is —F or —CF$_3$. Preferred embodiments include those wherein the hexafluoropropyleneoxy units (C$_3$F$_6$O) are in an ordered relationship to each other and are represented by $$[CF(CF_3)CF_2O]$$

wherein X is —CF$_3$; wherein $R_f$ is CF$_3$CF$_2$CF$_2$—; and wherein $m$ is 6–21, and especially 21. In the above formulas $m$ represents an average value. Still other embodiments include those wherein a minor amount of the phosphinate having one of the aforesaid formulas, or any of said preferred embodiments, is admixed with a major amount of a poly(hexafluoropropylene oxide) oil having the formula $R_f(C_3F_6O)_n R'_f$, $R_f O(C_3F_6O)_n CF(CF_3)H$, or $$R_f O[CF(CF_3)CF_2O]_n CF(CF_3)CF(CF_3)[OCF_2CF(CF_3)]_n OR_f$$

wherein $R_f$ is as defined above, $R'_f$ is a perfluoroalkyl group of 1–2 carbon atoms, and $n$ is an integer equal to the average degree of polymerization, that is, the average number of recurring monomeric units which bonded together during the polymerization stage of the process sequence by which the oil was formed; said poly(hexafluoropropylene oxide) oil also having an average molecular weight of at least 3,000, a pour point not in excess of 10° C. and a volatility of less than 50% at 204.4° C.; said mixtures being superior to the base oils in resistance to degradation and in their tendency to induce corrosion in metals such as steel, stainless steels, aluminum, titanium and alloys of titanium, especially at temperatures of about 260–370° C. (500–700° F.). Preferred embodiments of said mixtures include those wherein the phosphinate has the formula $$CF_3CF_2CF_2O[CF(CF_3)CF_2O]_m CF(CF_3)CH_2OP(:O)(C_6H_5)_2$$

wherein $m$ is as defined above; wherein the phosphinate comprises 0.5–10 weight percent of the mixture and the poly(hexafluoropropylene oxide) oil has the formula $R_f O[CF(CF_3)CF_2O]_n CF_2CF_3$ wherein $R_f$ and $n$ are as defined above; and wherein the phosphinate comprises 1–10 weight percent of the mixture and the poly(hexafluoropropylene oxide) oil has an average molecular weight of 4,500–7,000 and has the formula $CF_3CF_2CF_2O[CF(CF_3)CF_2O]_n CF_2CF_3$ wherein $n$ is as defined above.

The phosphinates of the present invention can be prepared by reacting the corresponding fluorinated alcohol with diphenylphosphinyl chloride ClP(:O)(C$_6$H$_5$)$_2$. The fluorinated alcohol can be prepared by reducing the corresponding acid fluoride with an alkali metal borohydride in an inert solvent by well known techniques. Typically, the phosphinates having the formula $$R_f O(C_3F_6O)_m CFXCH_2OP(:O)(C_6H_5)_2$$

are prepared by reacting the alcohol and the chloride in pyridine. Molar proportions for the reaction are 1 mole of the alcohol and at least 1 mole of the phosphinyl chloride in the presence of at least about 1 mole of pyridine or lutidine. The reaction is effected by heating the 3-component mixture for 17–25 hours with agitation at 100° C. After cooling the reaction mixture to about 20–30° C. it is diluted with a volume of 1,1,2-trichloro-1,2,2-trifluoroethane which is about 0.5–3 times the volume of the mixture. The resulting solution is washed repeatedly with fresh portions of water until the water washings are chloride-free (for example, as indicated by a silver nitrate test). After a final separation of the solution from water and drying by contacting the solution with a drying agent such as anhydrous calcium or magnesium sulfate, the solvent is removed by evaporation to provide the desired phosphinate. Cloudiness in the final product, if present, may be removed by any suitable means such as centrifugation, extra water washing, washing with dilute aqueous sodium bicarbonate or, for the phosphinates wherein $m$ is about 21 or more, washing with diethyl ether.

The preparation of the diphosphinates of this invention can be carried out by a similar procedure, with the molar amounts being appropriately adjusted to compensate for the difunctionality.

When the phosphinates of this invention are used as stabilizers or corrosion inhibitors in poly(hexafluoropropylene oxide) oils, they are added in an effective amount. By effective amount is meant the amount required to produce useful inhibition of metal corrosion and oil degradation for the required service life of the device containing the oil at the desired operating temperature. Various metals differ considerably in the amount of corrosion which will occur and in their ability to promote oil degradation. Hence, the effective amount of additive will vary with the service and with the metals in contact with the oils. In general, the amount of phosphinate required will be in the range of about 0.5–10% by weight of the oil. At less than 0.5% concentration the additive usually does not perform effectively. Additive concentrations above 10% seldom produce any increase in effectiveness. For a general purpose, high-temperature oil it is preferable to add about 1–10% phosphinate. This range provides for the vast majority of the needs for the oils.

Preparation of the oils containing the phosphinates is by simple mixing of the two components in the indicated proportions. The phosphinates are fully soluble above about 200° C., that is, at normal use temperatures. The lower molecular weight phosphinates, for example, where $m$ is about 6–11, are best mixed with the oils at about 200° C. to assure complete solubility. Dissolution of the phosphinates wherein $m$ is about 11–21 usually is essentially complete at 25–100° C., while the phosphinates with $m$ equal to 21 or more are completely soluble at temperatures of about 20–25° C.

The poly(hexafluoropropylene oxide) oils are well known in the art. As this term is employed herein, it includes oils derived from hexafluoropropylene oxide as well as those derived from hexafluoropropylene via an oxidative polymerization. The oils useful herein have an average molecular weight of at least 3,000, preferably 3,000–13,000; have volatilities less than 50% at 204.4° C. (400° F.) as determined by Federal Test Method FTMS–791, Method 351; and have a maximum pour point of 10° C. (50° F.) as determined by American Society of Testing Materials Test Method D–97.

Preferred oils have the formula $$R_fO[CF(CF_3)CF_2O]_nCF_2CF_3$$

wherein $R_f$ is a perfluoroalkyl group of 1–4 carbon atoms, have a molecular weight range of about 4,500–7,000, and have pour points of about $-10°$ C. to $-40°$ C. A particularly preferred $R_f$ is $CF_3CF_2CF_2-$.

The following examples are illustrative of the preparation of the phosphinates of this invention and their use.

Example 1

To a dry, 3-liter, 3-necked, glass flask provided with agitation, a calcium chloride drying tube, and an electrical heater were charged 1884 grams (0.525 mole) of $$CF_3CF_2CF_2O[CF(CF_3)CF_2O]_mCF(CF_3)CH_2OH$$

wherein $m$ is about 21, average (prepared by the method described by Le Bleu and Fassnacht in U.S. Patent 3,293,306), 210 grams (0.86 mole) of diphenylphosphinyl chloride (prepared by the method described by Meisenheimer, Liebigs Annalen, Vol. 449, pages 228–9, 1926), 64 grams (0.86 mole) of pyridine (previously dried by standing for one week over 20 weight percent of reagent grade potassium hydroxide pellets). A thermometer was inserted into the reaction mass and after sealing the flask except for the drying tube, the reaction mass was heated to and agitated at $100\pm2°$ C. for 20 hours and then cooled to about 25° C. To the cooled mass was added 1,500 ml. of 1,1,2-trichloro-1,2,2-trifluoroethane. After mixing, the resulting solution was washed manually in a separatory funnel, first with two separate 500 ml. portions of distilled water and then with three separate 300 ml. portions of distilled water. After separating the organic (lower) oil phase from the last water wash, the organic phase was manually agitated with about 10 weight percent of magnesium sulfate for about five minutes. The solution was separated from the magnesium sulfate by filtration and freed of most of the trichlorotrifluoroethane by heating with agitation in an open vessel until the oil temperature reached 145° C. The oil was next washed with six separate 200 ml. portions of diethyl ether. After separation from the final ether wash, residual ether was removed from the oil by heating in an open vessel until the oil temperature reached 140° C. The resulting, clear, mobile oil weighed 1510 grams. The product was submitted to infrared analysis; there was no absorption at $2.9\mu$, indicating the absence of alcohol. Infrared evidence clearly indicated the presence of the phosphinate structure $$-CH_2OP(:O)(C_6H_5)_2$$

Example 2

A phosphinate was prepared using a procedure similar to that of Example 1 by heating a mixture of 23 grams of $CF_3CF_2CF_2O[CF(CF_3)CF_2O]_{11}CF(CF_3)CH_2OH$, 3 grams of diphenylphosphinyl chloride, and 1 gram of dry pyridine for 21 hours at $100\pm2°$ C. After water washing, drying, and evaporation of the solvent the resulting oil showed the characteristic infrared spectrum of the desired phosphinate.

Example 3

A procedure similar to that of Example 1 was used to prepare a lower molecular weight phosphinate. The alcohol used was $$CF_3CF_2CF_2O[CF(CF_3)CF_2O]_6CF(CF_3)CH_2OH$$

and 2,6-lutidine was used in place of pyridine. The resulting oil was characterized by infrared analysis as already described.

Examples 4 to 37

Phosphinate-poly(hexafluoropropylene) oil mixtures of this invention were prepared and evaluated using a modified form of the apparatus specified in the WADD Micro-oxidation-Corrosion Test of High Temperature Fluids, Fluids and Greases Section, Aeronautical Systems, Wright-Patterson Air Force Base, replacing the specified Pyrex tube with an Inconel tube. Basically, the apparatus consisted of a 3.18 mm. diameter Inconel tube adapted for mounting three washers outside the lower end. The 3.18 mm. tube was inserted inside a 20.6 mm. diameter vertical Inconel tube so that the washers were immersed in a body of oil contained in the larger tube. The larger tube, which was adapted with a condenser for recovering any oil which may have stripped from the tube, was inserted into an aluminum heating block.

Various metal washers of the compositions in Table I were tested.

TABLE I

| Metal | Composition |
|---|---|
| A. Titanium and alloys thereof: | |
| 1 | Ti with 6% Al and 4% V. |
| 2 | Ti with 4% Al and 4% Mn. |
| 3 | Ti. |
| B. Ferrous alloys (steels): | |
| 1 | Fe with 1.1% C, 17% Cr, 1% Mn, 1% Si and 0.75% Mo. |
| 2 | Fe with 0.8% C, 4% Cr, 0.25% Si, 4.5% Mo, 0.1% Ni and 1% V. |
| 3 | Fe with 0.3–0.9% Mn. |

The test consisted of placing test washers of the metals to be tested in the apparatus, adding sufficient oil to ensure that the washers were covered, assembling the remaining apparatus and inserting it in the heating block. The oil was then heated to the test temperature and air was passed down through the smaller tube into the body of oil containing the washers. Test duration was 72 hours. Dry air flow rate into the oil during the test was five liters per hour, measured at 25° C.

Degradation of a test oil was determined by measuring the percent change in the viscosity of the test oil during the test. The results are expressed as:

Percent viscosity change $$= \frac{(cs.\ after\ test) - (cs.\ before\ test)}{(cs.\ before\ test)} \times 100$$

where cs. is the kinematic viscosity in centistokes at 37.78° C. When the sign of the percent viscosity change is negative, oil degradation has occurred. When the sign is positive, high temperature loss of volatile oil components is indicated. It will be noted from Table II which follows that oil degradation frequently was accompanied by increased fluid loss from the apparatus since degradation of polymer chains provided fragments having greater volatility than the origial polymer.

Corrosion was determined by weighing the test washers before and after the test. Corrosion rate was calculated (as mg./cm.²/day) from weight change and known washer surface area. Before weighing, both before and after the test, the test washers were cleaned by scrubbing with glass wool in trichlorotrifluoroethane until all loose deposits on the washers were removed. The oil used in the following 34 examples had the formula $$CF_3CF_2CF_2O[CF(CF_3)CF_2O]_nCF_2CF_3$$

wherein $n$ was sufficiently large to afford an oil with an average molecular weight of about 5,000. Similar results were achieved when other oils falling within each of the aforesaid three generic formula definitions were employed. The phosphinate used as the additive had the formula $$CF_3CF_2CF_2[CF(CF_3)CF_2O]_m$$
$$CF(CF_3)CH_2OP(:O)(C_6H_5)_2$$

wherein $m$ was as shown in Tables II and III.

TABLE II

| Example | M | Metal (Table I) | Wt. percent additive | 315.6° C. (600° F.) | | 342.3° C. (650° F.) | |
|---|---|---|---|---|---|---|---|
| | | | | Percent fluid loss | Percent visc. change | Percent fluid loss | Percent visc. change |
| 4 | | A-1,2,3 | 0 | 100 | | 78 | −99 |
| 5 | 21 | A-1,2,3 | 2.5 | | | 23.4 | −72.6 |
| 6 | 21 | A-1,2,3 | 5.1 | 11.3 | 17.8 | 1.6 | 5.9 |
| 7 | | B-1,2,3 | 0 | | | 19.4 | −30.5 |
| 8 | 6 | B-1,2,3 | 1.1 | | | 6.8 | 3.5 |
| 9 | 11 | B-1,2,3 | 3.3 | | | 10.0 | 0.3 |
| 10 | 11 | B-1,2,3 | 6.4 | | | 3.1 | 6.7 |
| 11 | | A-1 | 0 | | | 86.7 | −99.0 |
| 12 | 6 | A-1 | 1.1 | | | | −68.0 |
| 13 | 11 | A-1 | 3.3 | | | 24.2 | −8.9 |
| 14 | 11 | A-1 | 6.4 | | | 3.1 | 6.7 |

TABLE III

| Example | m | Metal (Table I) | Wt. percent additive | Corrosion rate [1] |
|---|---|---|---|---|
| 15 | | A-1 | 0 | −0.11 |
| 16 | 6 | A-1 | 1.1 | 0.01 |
| 17 | 11 | A-1 | 3.3 | −0.05 |
| 18 | 11 | A-1 | 6.4 | −0.06 |
| 19 | 21 | A-1 | 5.1 | −0.01 |
| 20 | | A-2 | 0 | −0.63 |
| 21 | 21 | A-2 | 2.5 | −0.46 |
| 22 | 21 | A-2 | 5.1 | 0.01 |
| 23 | | A-3 | 0 | −0.29 |
| 24 | 21 | A-3 | 2.5 | −0.14 |
| 25 | 21 | A-3 | 5.1 | 0.01 |
| 26 | | B-1 | 0 | −6.4 |
| 27 | 6 | B-1 | 1.1 | 0.08 |
| 28 | 11 | B-1 | 3.3 | 0.11 |
| 29 | 11 | B-1 | 6.4 | 0.15 |
| 30 | | B-2 | 0 | −4.5 |
| 31 | 6 | B-2 | 1.1 | 1.2 |
| 32 | 11 | B-2 | 3.3 | 1.5 |
| 33 | 11 | B-2 | 6.4 | 1.2 |
| 34 | | B-3 | 0 | 0.57 |
| 35 | 6 | B-3 | 1.1 | 0.14 |
| 36 | 11 | B-3 | 3.3 | 0.22 |
| 37 | 11 | B-3 | 6.4 | 0.19 |

[1] Mg./cm.²/day (343.3° C. [650° F.]).

The embodiments of the invention in which an exclusive property or privilege is claimed are defined as follows:

1. A perfluorinated polyether substituted methyldiphenyl phosphinate having the formula $$R_fO(C_3F_6O)_mCFXCH_2OP(:O)(C_6H_5)_2$$

or $$(C_6H_5)_2P(:O)OCH_2CFX(C_3F_6O)_m\\CFXCH_2OP(:O)(C_6H_5)_2$$

wherein $R_f$ is a perfluoroalkyl group of 1-6 carbon atoms, $m$ is an integer in the range 3-50, and X is —F or —CF$_3$.

2. The phosphinate of claim 1 having the formula $R_fO[CF(CF_3)CF_2O]_mCF(CF_3)CH_2OP(:O)(C_6H_5)_2$.

3. The phosphinate of claim 2 wherein $R_f$ is $$CF_3CF_2CF_2—$$

4. The phosphinate of claim 2 wherein $m$ is 6–21.

5. The phosphinate of claim 4 wherein $m$ is 21.

References Cited

UNITED STATES PATENTS

| | | | |
|---|---|---|---|
| 2,899,454 | 8/1959 | McBee et al. | 260—955 |
| 3,306,855 | 2/1967 | Borecki | 252—49.9 |
| 3,340,331 | 9/1967 | Richardson et al. | 260—955 |
| 3,492,374 | 1/1970 | Le Bleu et al. | 260—950 |

CHARLES B. PARKER, Primary Examiner

R. L. RAYMOND, Assistant Examiner

U.S. Cl. X.R.

252—49.9; 260—929